Sept. 10, 1968  J. B. DAHMS ET AL  3,400,980
APPARATUS FOR INSERTING DOWN HOLE MECHANISM THROUGH BORE HOLES
Filed March 11, 1966  7 Sheets-Sheet 1

INVENTORS
JAMES B. DAHMS
BYRON P. EDMONDS

ATTORNEYS

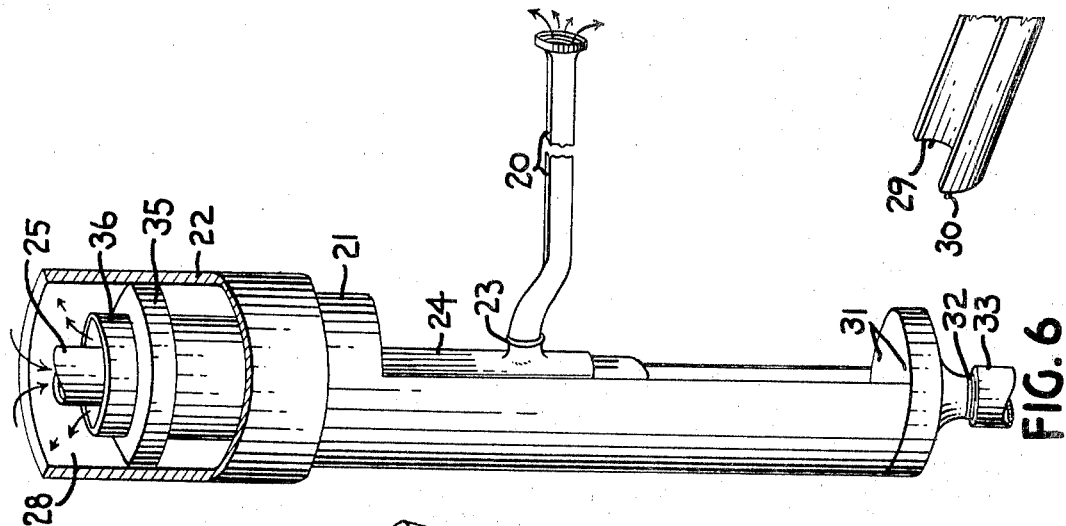
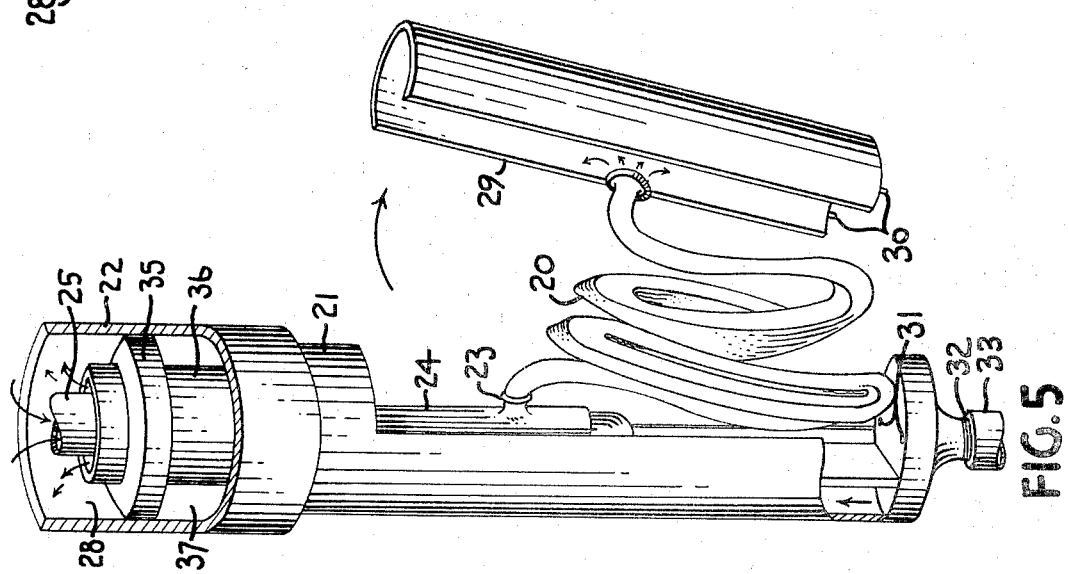
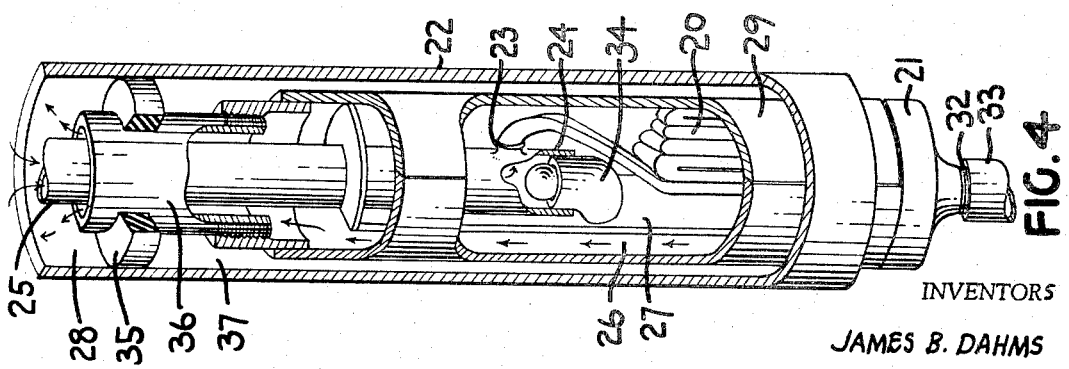

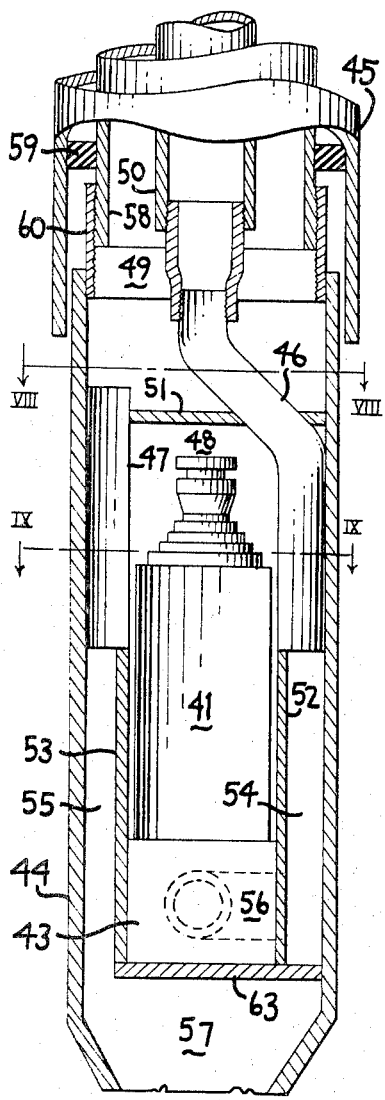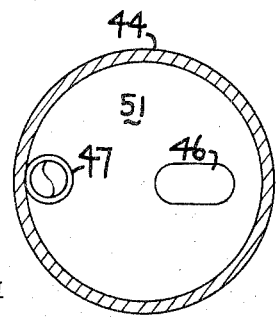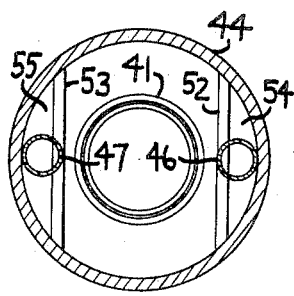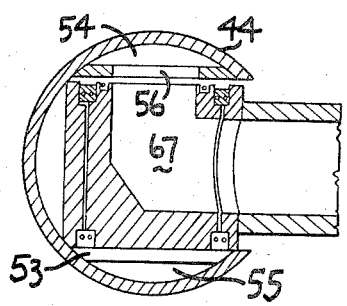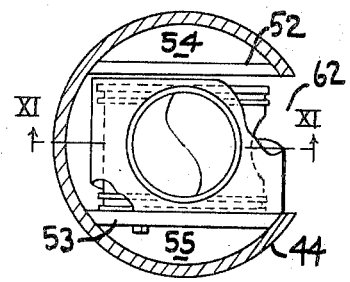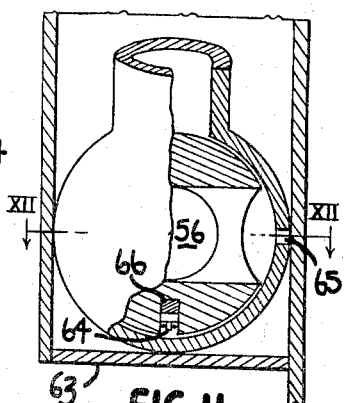

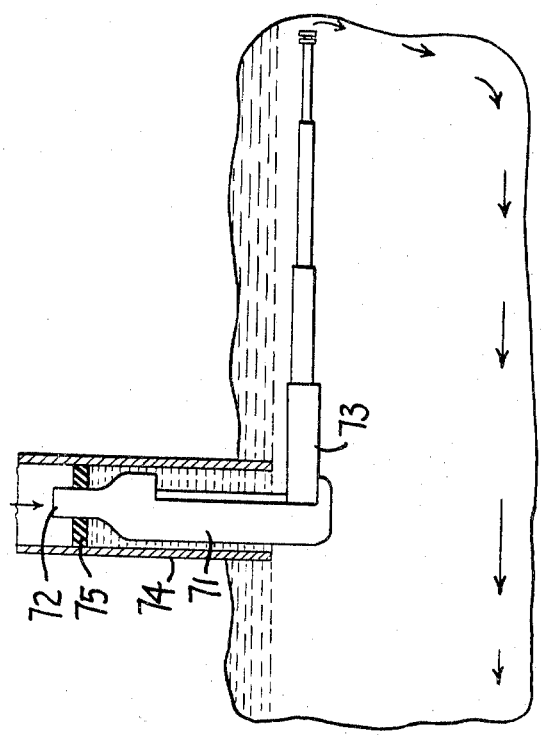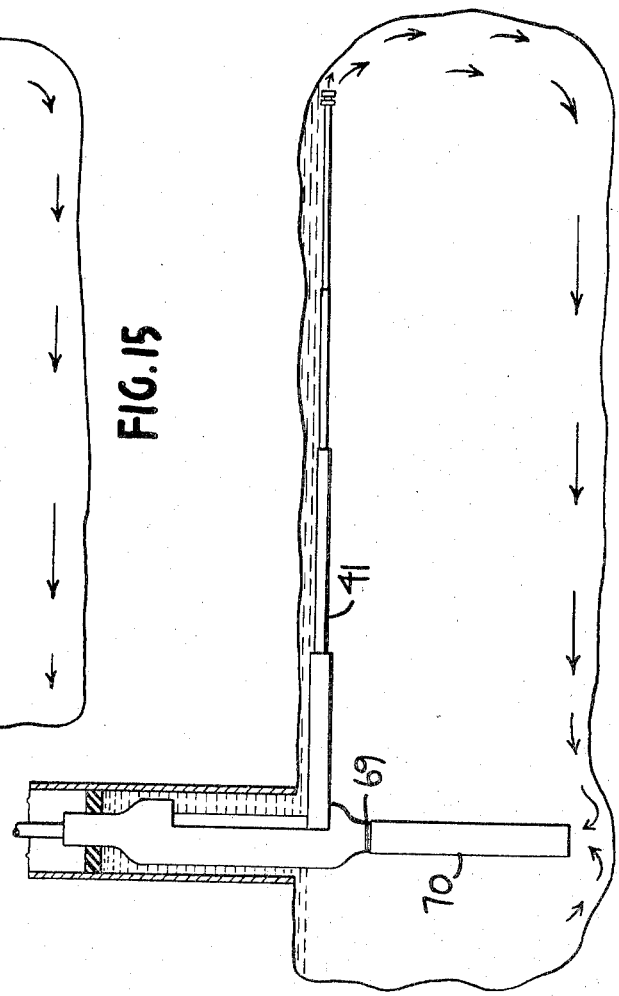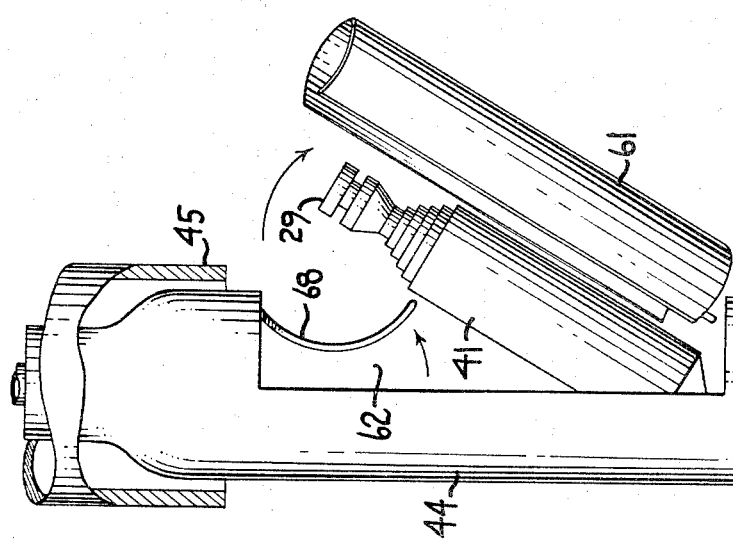

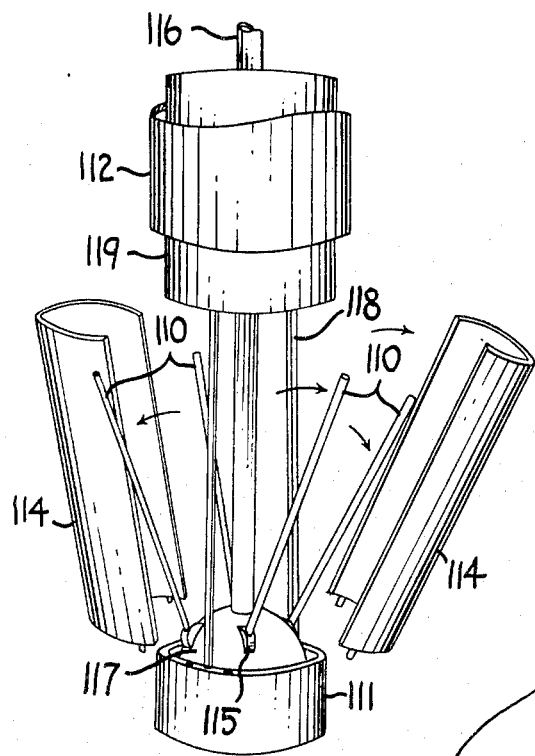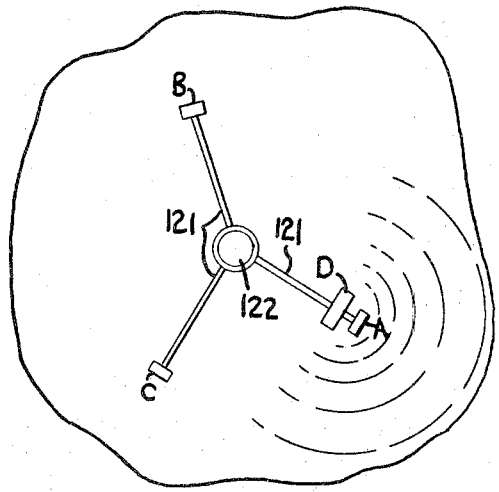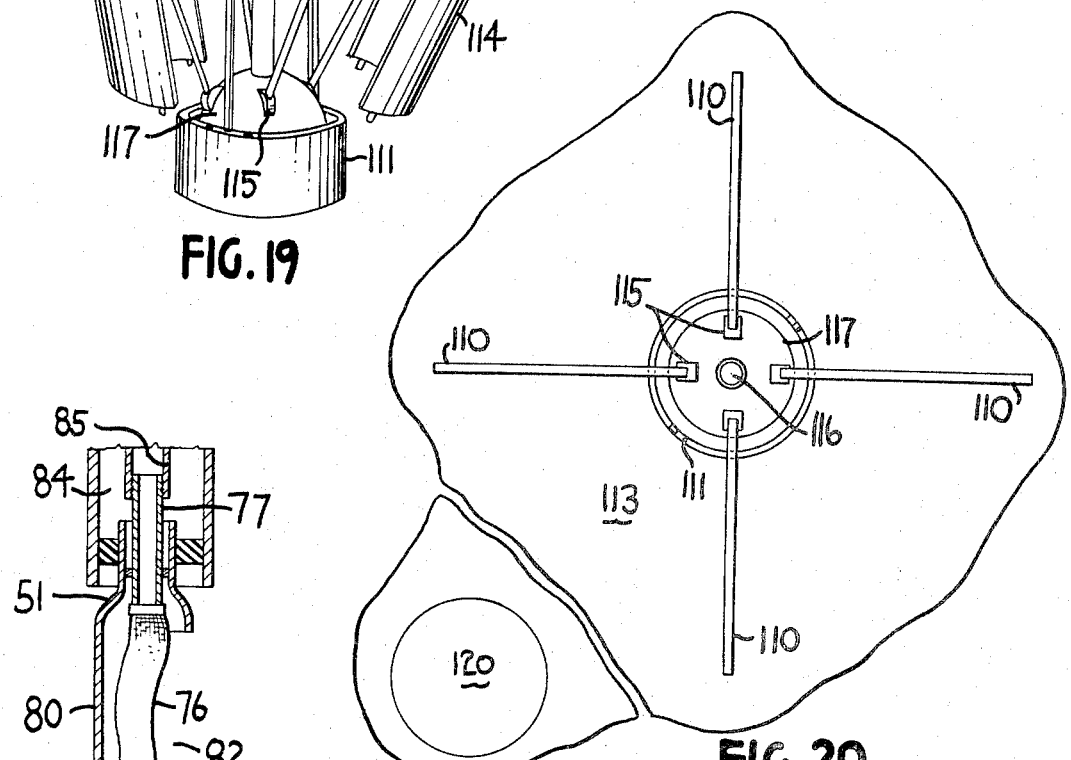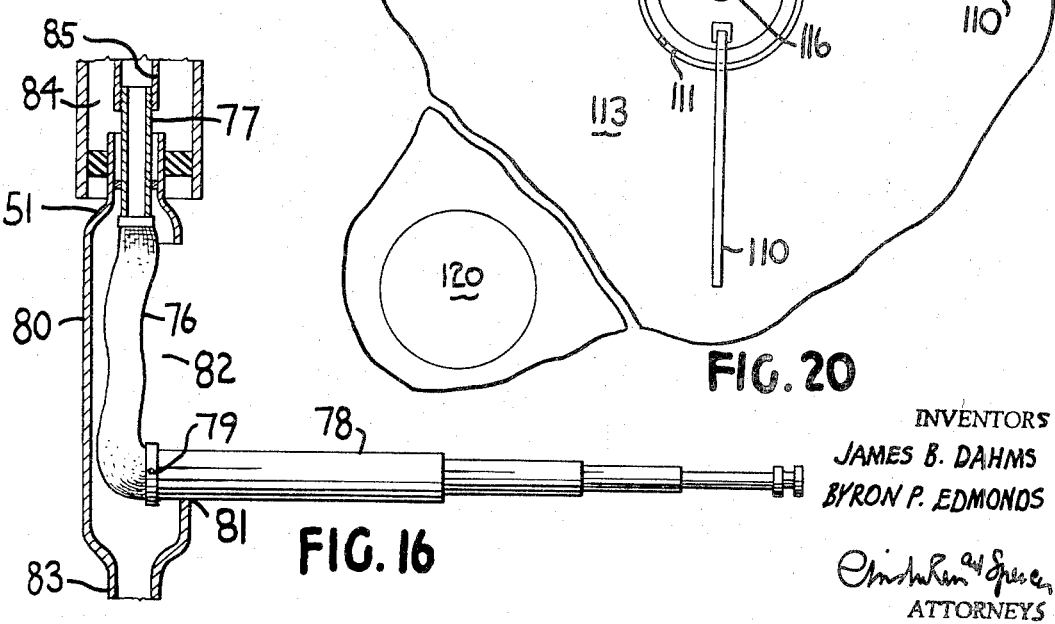

Sept. 10, 1968  J. B. DAHMS ET AL  3,400,980
APPARATUS FOR INSERTING DOWN HOLE MECHANISM THROUGH BORE HOLES
Filed March 11, 1966  7 Sheets-Sheet 6

INVENTORS
JAMES B. DAHMS
BYRON P. EDMONDS

ATTORNEYS

Sept. 10, 1968  J. B. DAHMS ET AL  3,400,980
APPARATUS FOR INSERTING DOWN HOLE MECHANISM THROUGH BORE HOLES
Filed March 11, 1966  7 Sheets-Sheet 7

INVENTORS
JAMES B. DAHMS
BYRON P. EDMONDS

ATTORNEYS

United States Patent Office 3,400,980
Patented Sept. 10, 1968

3,400,980
APPARATUS FOR INSERTING DOWN HOLE
MECHANISM THROUGH BORE HOLES
James B. Dahms, New Martinsville, W. Va., and Byron
P. Edmonds, Regina, Saskatchewan, Canada, assignors
to Kalium Chemicals Limited, Regina, Saskatchewan,
Canada, a corporation of Canada
Filed Mar. 11, 1966, Ser. No. 533,558
9 Claims. (Cl. 299—5)

ABSTRACT OF THE DISCLOSURE

An apparatus for introducing a device into a subterranean cavity is disclosed which includes a container for the device and a hatch means associated with the container. A cover member is associated with the hatch means and arranged so that it protects the device in the container while it is in the well casing but adapted to fall away as the container passes from the casing into the cavity.

Figure 1:
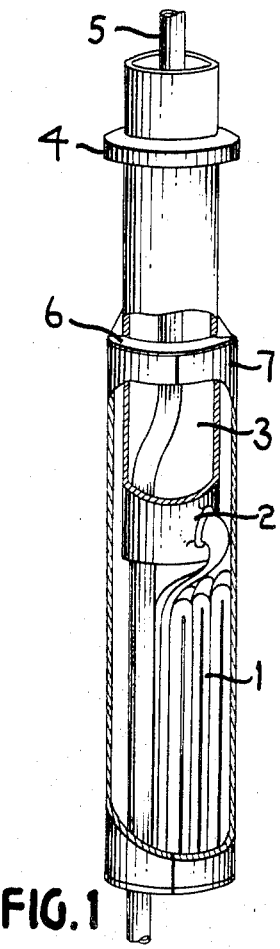

This invention relates to placing down hole mechanisms in a subterranean cavity. It more specifically relates to novel apparatus for inserting down hole mechanisms through a cased bore hole to a subterranean cavity and methods for the use thereof.

Very often in subterranean operations, notably in solution mining, it is desired to place a variety of mechanisms ranging from simple pipe extensions to complicated gadgetry in a subterranean cavity. The only access to such a cavity may be through one or more cased bore holes of limited diameter. In solution mining of salts, e.g., NaCl, KCl, trona, or similar extractable materials, the casings employed are rarely in excess of 12 inches internal diameter. More often, the casings employed are between about 4 and about 10 inches in diameter. In typical solution mining operations where a cased bore hole is disposed through subterranean formations to communicate with a cavity located, e.g., less than 1,000 to 5,000 or more feet beneath the surface of the earth, 7 inch casings are commonly employed. Pushing down hole mechanisms through this limited access is hazardous to the equipment. The difficult and hazardous nature of the operation severely limits the type of equipment which can be disposed in a bore hole. Typically only very rugged mechanisms of a simple nature have been inserted through a long casing to a subterranean cavity. The present invention provides simple yet effective means for introducing delicate and/or complicated down hole mechanisms to a subterranean cavity.

The apparatus of the present invention comprises a container, carrier, chamber or "can" adapted to contain the particular equipment desired to be introduced to a cavity. The can protects the down hole device from damage while it is being introduced down a bore hole. The can is further adapted to release or orient the device in the cavity as the can emerges from the bore hole into the cavity. Other means, e.g., solvent supply or impulse means, emplacement means, orientation means, etc., may also be associated with the apparatus of this invention.

Particularly useful adaptations of the claimed apparatus are those employed to deliver delicate solvent carrying devices to a subterranean cavity. In a typical solution mining operation, a cased bore hole is provided through the earth to an extractable deposit. One or more tubes are then disposed through the bore hole to communicate with the deposit. These tubes provide additional conduits for fluid flow. Typically, solvent is introduced to the deposit through the annulus between the centrally disposed tubing and the casing of the bore hole to contact the extractable deposit. Solution laden with extracted minerals is then withdrawn from the deposit to the surface of the earth through the centrally disposed conduit thereby forming a cavity in the extractable deposit.

At first, when the cavity is small, a solution mining system is normally quite uneconomical. As the cavity size is increased, the economics of the operation significantly improve. The efficiency and productivity of a solution mining cavity may often be greatly improved by developing the cavity in selected directions to produce a cavity of a desired shape. The desired shape of a cavity depends largely on the configuration and mineral composition of the mineable and adjacent deposits.

Economics, productivity, and efficiency of a solution mining operation also generally improve when the injection point at which solvent is introduced to the cavity is separated by a substantial distance from the effluent point at which solution is withdrawn from the cavity. This separation results in an improved fluid flow pattern in the cavity. Lateral separation of the injection and withdrawal points is particularly beneficial. Such lateral separation is most conveniently obtained by providing in the cavity horizontal extensions of the injection and/or withdrawal conduits.

It is often desirable to develop a plurality of cavities until they communicate with each other. The internal piping or tubing can then be removed from the bore holes communicating with the respective cavities. One such bore hole can then function as the solvent input conduit while the laterally separated bore hole functions as the effluent withdrawal conduit. It is usually desirable to accomplish this connection of separated bore holes as quickly as possible. Connection of separated bore holes is greatly facilitated by preferentially extracting the deposit at the base of a bore hole towards a separated bore hole. Extraction in a selected direction is encouraged by providing in the cavity lateral extensions to the supply conduit or conduits oriented in the desired direction.

Co-pending application Ser. No. 533,489, filed Mar. 11, 1966, teaches the introduction of flexible conduits to a solution mining cavity. The tube is oriented and extended in the earth to provide a lateral extension of the casing from which it originates. Commonly assigned, co-pending application Ser. No. 533,518, filed Mar. 11, 1966, teaches the introduction of telescoping rigid conduits to a cavity. The nested tubes are oriented and extended to provide lateral extensions of the injection and/or withdrawal casings. The conduits disclosed in the aforementioned co-pending applications are subject to damage as they are introduced down a bore hole. The apparatus of the present invention provides protective carrying means for these delicate extendable conduits. The claimed apparatus is also useful to protectively introduce other delicate devices besides solvent delivery systems such as flow diverters, photographic equipment, electronic gear, sample retrieval devices, etc.

Figure 17:
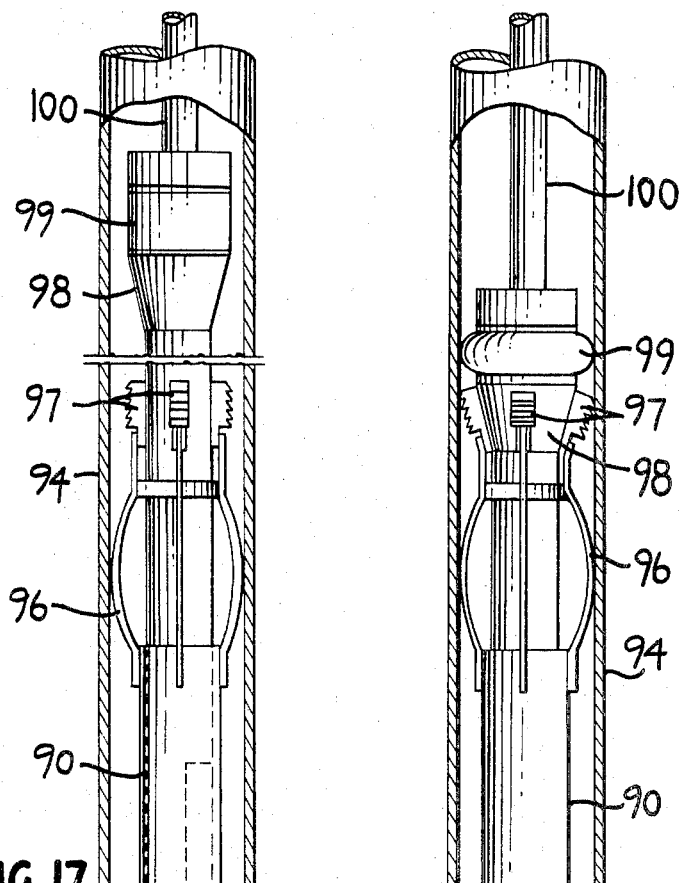
Figure 18:
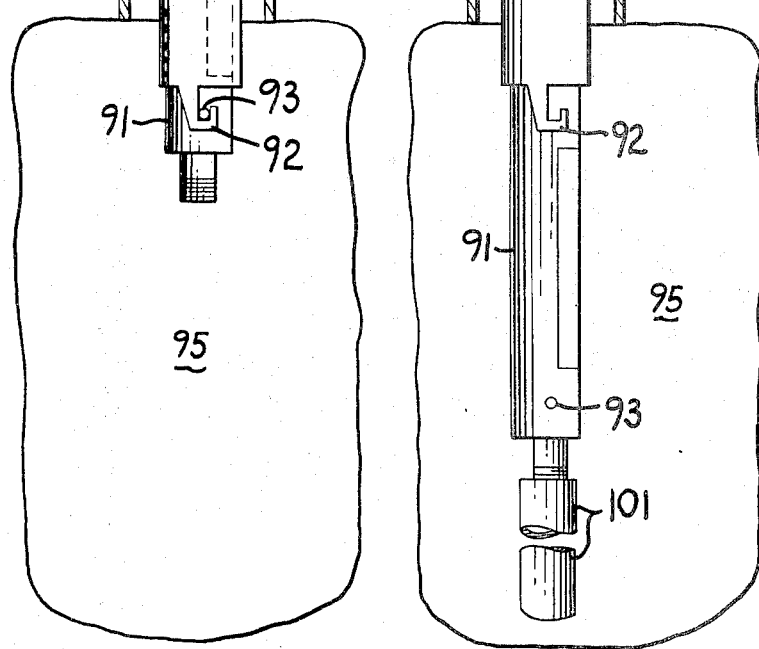
Figure 22:
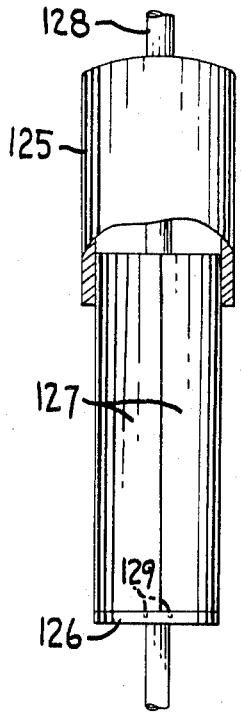
Figure 23:
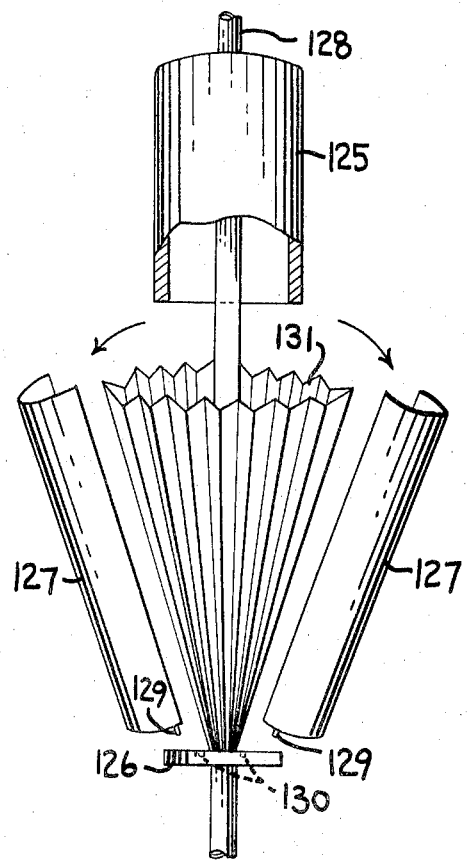
Figure 24:
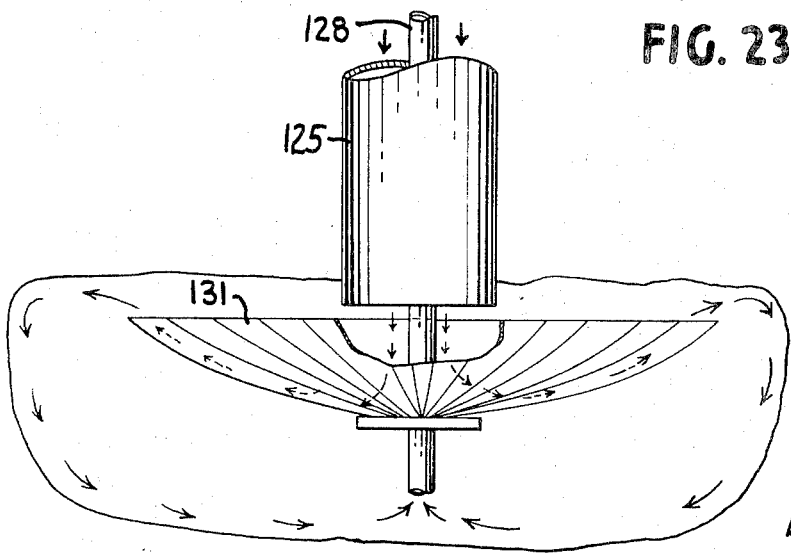

The invention will be more readily understood with reference to the accompanying drawings of which FIGURES 1, 2, 3, 4, 5 and 6 illustrate embodiments of the apparatus adapted for use with flexible tube solvent delivery systems. FIGURES 7 through 16 illustrate embodiments of the apparatus useful in connection with telescoping or collapsible tube solvent delivery systems. FIGURES 17 and 18 illustrate an embodiment of the claimed device in which the hatch is covered by an outer concentric pipe section. FIGURES 19 and 20 illustrate an embodiment wherein essentially the entire carrier is removable to provide an extensive hatch. FIGURE 21 illustrates how the claimed apparatus is useful in sonar technology and FIGURES 22, 23 and 24 illustrate an application of an embodiment for introducing a flow diverter to a cavity.

FIGURE 1 shows one design of a carrier assembly for the introduction of a flexible tube to a cavity. The flexible tubing 1 is packed in can 6 in much the same fashion as a fire hose is packed in a fire hose container. Nozzle 2 communicates with a chamber 3 which extends beyond packing means 4. Tubing 5 extends through the entire can. This apparatus protects the flexible tubing 1 as it is introduced through a casing. The can is split, one portion 7 being removable. The manner in which this can portion or hatch 7 is removed is illustrated in connection with FIGURES 4 through 6. In the apparatus of FIGURE 1, solvent flow is from the annulus above the packing 4 through chamber 3 and the nozzle 2 into and through the flexible tube 1. Cavity solution is withdrawn through the tubing 5.

Transient pressures across the flexible tubing may be relieved during introduction of the apparatus shown in FIGURE 1 by any convenient valve means. Many such valves, e.g., sleeve valves, are known to the art. The valve (not shown) provides communication between the annulus or the chamber 3 and tubing 5 while the can is being introduced down a bore hole. When the can is in position, the valve is closed in response to mechanical manipulation or electrical impulse. The valve may also close in response to the removal of hatch 7. Pressure relief may also be accomplished by employing an expandable packer as the packing means 74. If the packer is left contracted until the can is in proper position, the transient pressures are often inconsequential thereby eliminating the need for a pressure relief valve.

Figure 2:
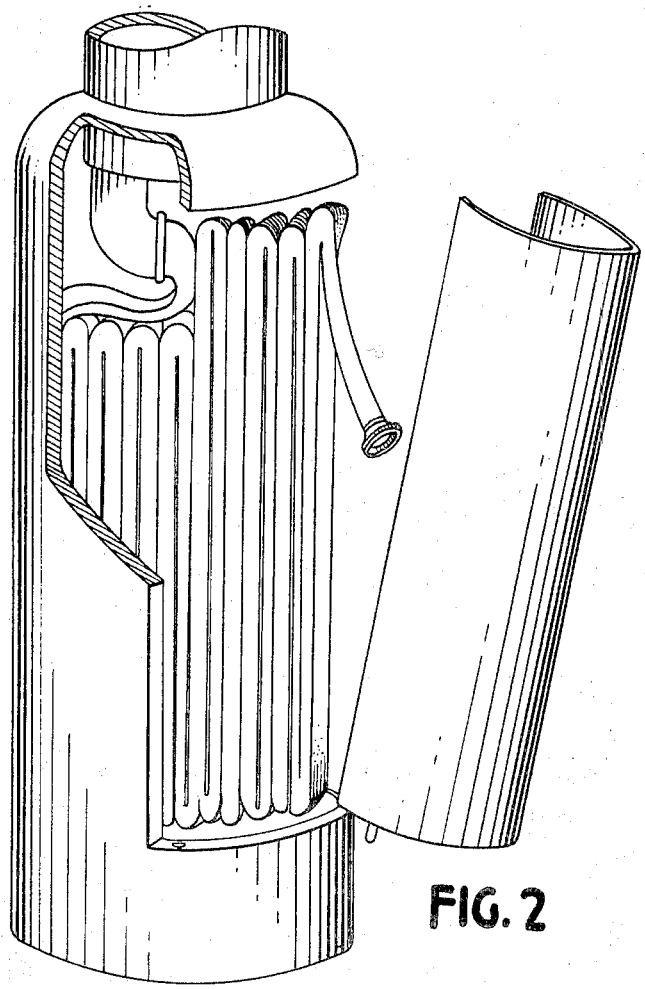
Figure 3:
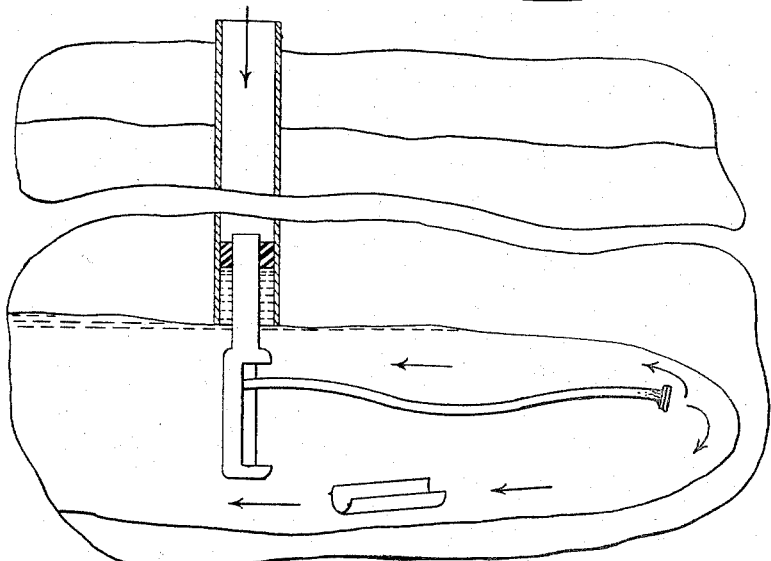

Simpler carrier assemblies are employable in a well developed cavity communicating with a plurality of bore holes. When separate bore holes are used as introduction and withdrawal conduits, only one fluid-carrying conduit need be provided in association with the carrier assembly. The elimination of one of the conduits from the interior of the assembly makes it possible to pack a much longer tube of a given diameter in the can. Such a carrier assembly is illustrated in FIGURE 2. Carriers of this type may be suspended from the interior of a casing by packing means as illustrated in FIGURE 3. By eliminating the concentrically disposed tubing from a bore hole, the flow rate of fluids passed through the bore hole can be increased. This increased flow rate facilitates the extension of the flexible tube.

Referring to FIGURE 4, a length of flexible tubing 20 is shown packed inside carrier can 21. The can assembly is contained inside a bore hole casing 22. The flexible tube is attached to a nozzle 23 which communicates with a chamber 24 adapted to communicate with supply tubing 25. The fluid passage 26 for withdrawal from the cavity is provided by plate 27 placed as a diagram in the back of the can. This fluid passage connects with the annulus 28 external of tubing 25. An opening is provided in the can. This opening is closed by hatch 29 which is a portion of the can adapted to be removable from the can when it enters a cavity. The hatch is removably fixed at the bottom of the can by pegs 30 which fit into holes 31 (FIG. 5). The hatch may be biased for removal by a spring or equivalent means (not shown) although the bias of the packed tube is often sufficient to remove the hatch. A threaded or equivalent portion 32 is provided at the bottom of the can in communication with fluid passage 26. An extension 33 of chosen length can be attached to this portion. In this fashion, the withdrawal point is located at the desired depth in the cavity and can be relocated from time to time. A ball valve 34 or equivalent pressure relief means is provided to allow equalization of pressure across nozzle 23 thereby avoiding rupturing the flexible tube by transient pressures arising from introduction of the can down the casing. The annulus 37 between the can and the casing is blocked with packing means 35, e.g., packing cups or expandable or inflatable packers. Because the external diameter of the can 21 is only slightly smaller than the internal diameter of the casing 22, end portion 36 of the can is sufficiently reduced in diameter to accommodate the packing means 35.

FIGURE 5 shows the operation of the release of the hatch 29. The carrier assembly has been dropped sufficiently below the casing to allow the hatch to fall free. Prior to being introduced to the top of the cavity, the biased hatch is compressed against the casing 22. The frictional pressure of the casing holds the hatch over the flexible tube thereby protecting it. After the hatch has fallen free, fluid pressure, usually provided by the introduction of solvent, causes the flexible tube to extend horizontally as shown in FIGURE 6. Solvent is injected down tubing 25 into chamber 24 and through the nozzle 23 to the flexible tube 20. Effluent flow is into the extension 33 through the passage 26 in the carrier assembly to the annulus 28. Carrier assemblies such as those illustrated in connection with flexible tubes are adaptable to introduce telescoping tubes to a subterranean cavity.

Referring to FIGURE 7, a nest of tubes 41 is attached to a hinged valve 43. This hinge means allows the nest to be pushed through a bore hole while in a vertical position. After the nested tubes are positioned in a cavity, the hinged valve allows the nest to be oriented in a non-vertical direction and extended. According to this invention, the valve and tubes are positioned as shown inside a container or carrier assembly 44 such as that shown in the drawing.

As is seen from FIGURES 7, 8 and 9, the nest of tubes 41 is packed in an upright or substantially vertical direction in container 44 as the container is lowered through a casing 45. It is recognized that a casing may not always be disposed in a strictly vertical orientation in practice. Often a bore hole is provided to a subterranean deposit in a direction with both a vertical and a significant horizontal component. The direction of the bore hole is often altered from time to time between the earth's surface and the subterranean terminus of the bore hole. The overall vertical component is normally much greater than the overall horizontal component, however. Hence, in the instant disclosure, the invention is described with reference to vertical bore holes. The solvent supply or other devices introduced down a bore hole in the apparatus of this invention and subsequently reoriented are accordingly described as being in an "upright" or "vertical" position. The invention includes within its scope embodiments in which such devices are disposed in a horizontal or some other direction, provided the axis of the carrier is approximately parallel to the axis of the bore hole.

The carrier 44 includes two fluid-carrying conduits, a supply conduit 46 and a withdrawal conduit 47. The valve 43 and nest 41 are located in a chamber 48 which is blocked off from the annulus 49 external of the tubing 50 by means of a plate 51. The hinged valve 43 is attached to plates 52 and 53 which extend as chords or diaphragms across the carrier 44 to seal off chambers 54 and 55, respectively. The valve is disposed above plate 63 which extends to seal chamber 54 from chamber 57 which openly communicates with chamber 55. Port 56 connects the valve 43 to chamber 54. When the nest is in an upright position as shown, the valve is closed. Chamber 55 openly connects the effluent conduit 47 with the open chamber 57 at the base of the assembly. A further conduit may be provided as an extension of chamber 57. (See FIGURE 14.) The carrier is adapted, e.g., with threads to be attached to a liner 58. The liner 58 extends only part way up the casing 45 and is sealed to the casing with packing means 59. because the outside diameter of the carrier 44 is nearly as great as the internal diameter of the casing 45, a reducing means 60 is provided to allow sufficient room between the casing and the liner to accommodate the packing means. The tubing 50 extends all the way to the surface of the earth. Annulus 49 openly connects to the annulus between the casing 45 and the tubing 50.

FIGURES 10, 11 and 12 show in greater detail the valve 43. FIGURE 10 shows a view of the valve looking down from the top of the carrier. The carrier is shown in FIGURE 10 with the door (see FIGURE 11) removed so that the nest of tubes is free to fall through hatch 62. FIGURE 11 shows the valve in the same position but in section looking into port 56. In the valve illustrated, the nest is locked into a position about at right angles to its upright position as it falls from the carrier causing latch 64 to fall into hole 65. The latch may be biased, e.g., with a spring 66. Of course, the nest can be locked into position at any selected angle to its stored position by choosing some other respective positioning of latch 64 and hole 65. FIGURE 12 illustrates the solvent path down chamber 54 through port 56 and elbow 67 into the nest after the nest has been locked into its selected position ready for use.

Referring to FIGURE 13, when assembly 44 is introduced to a point below the base of a cased bore hole 45, the nest 41 is allowed to fall from the assembly toward the horizontal position. It is sometimes desirable to provide a biasing means 68 to encourage the fall of the nest. When the carrier assembly emerges from the cased bore hole, the door 61, if such is provided, falls away allowing the tubes to drop through hatch 62 into roughly horizontal position as illustrated in FIGURE 14 of the drawings. The base of the carrier assembly may be adapted, e.g., with pipe threads 69 or equivalent means to receive an extension conduit 70. The length of the extension 70 is selected to locate the terminus of the second fluid flow passage at the desired depth in the cavity.

FIGURE 15 illustrates a telescoping nest of tubes extending from a simplified version of the apparatus of this invention. Carrier can 71 has only one fluid passage 72 connected directly to the nest of tubes 73. This assembly is conveniently suspended from the inside surface of casing 74 by packing means 75.

FIGURE 16 illustrates one of several possible embodiments in which the carrying means of this invention is adaptable for use with nested tubes or similar apparatus. The hinge mechanism of this embodiment is a section of flexible tubing 76 constructed of common fire hose fabric or similar material, e.g., rubberized nylon canvas. This flexible connection between the supply conduit 77 and the nest 78 is often desirable because it requires a small amount of space when the nested tubes (or other apparatus) are positioned vertically in the carrier assembly. The nest is mechanically hinged on pins 79 at the base of the carrier assembly 80. When the carrier assembly enters the cavity, the nest falls to a horizontal position in which position it is checked by a ledge 81 provided by the bottom of the hatch 82. The design shown provides a withdrawal nozzle 83 openly communicating with the annulus 84. Injection of solvent is down tubing 85 into supply conduit 77.

FIGURES 17 and 18 illustrate an embodiment in which the carrying apparatus of this invention comprises essentially two concentric pipes. The outer pipe 90 is held in relation to the inner pipe 91 by means such as a J hook 92 and lug 93. Referring to FIGURE 17, the inner pipe carries the mechanism to be introduced down the bore hole casing 94. The outer pipe serves as a shield or cover to protect the apparatus stored in the inner pipe as it is introduced down a casing 94. When the unit reaches the bottom of the casing, the inside pipe is raised slightly and turned to cause lug 93 to come out of J hook 92. The inner or carrier pipe may then be dropped or pushed down through the outer pipe as shown in FIGURE 18 exposing or releasing the internals to the cavity 95 communicating with casing 94. Means such as bow springs 96 suspend the outer pipe in the casing to hold the outer pipe in position as the inner pipe is moved independently.

As the inner pipe 91 is pushed down through the outer pipe 90, slips 97 ride up on mandrel 98 and bite into the casing wall to anchor the outer pipe even more firmly into position. The thus firmly anchored outer pipe offers sufficient resistance to the downward movement of the expandable packer 99 to cause it to expand to contact the casing wall (FIGURE 18). The expanded packer provides a complete seal of the annulus between the inner pipe 91 and the casing 94. Fluids introduced through this annulus are thus directed through the carrier to the apparatus, e.g., flexible tubes or telescoping tubes, contained therein. As in other embodiments, internal tubing 100 is conveniently disposed through the assembly to provide a second fluidizing conduit if desired. An extension 101 of the tubing is sometimes employed to locate the terminus of this second fluid-carrying conduit at a pre-determined elevation in the cavity.

FIGURES 19 and 20 illustrate a further embodiment of the apparatus of this invention. The carrier shown is adapted to release a plurality of members, in this case, solvent delivery tubes 110 as the carrier 111 emerges from the casing 112 into a cavity 113 (FIGURE 20). According to this embodiment, most of the can 114 splits away leaving a plurality of hatches from which the apparatus stored in the can enters the cavity. The solvent delivery tubes 110 are attached to turret valves 115 which provide means to orient the tubes horizontally as shown in FIGURE 20. Solvent is introduced through conduit 116 to turret 117. Valves 115 may be adapted to close when the tubes 110 are stored in upright position and open when the tubes are oriented as desired in the cavity. Structural members 118 may be provided to connect the turret containing portion of the can 111 to a top portion 119. In other embodiments, the top portion and structural members are dispensed with (see FIGURE 23). Solution withdrawal from a solution mining cavity may be through a separated bore hole 120 as illustrated in FIGURE 20. Alternatively, tubing may be disposed through conduit 116 and out the bottom of the can 111 as in the embodiments discussed hereinbefore to provide a withdrawal conduit. Tubing 116 may extend to the surface of the earth or it may be packed off to the casing 112.

The embodiment of FIGURES 19 and 20 is also useful for introducing electronic gear to a cavity. FIGURE 21 illustrates one such device, a sonar device used to measure the size and shape of a subterranean cavity. A plurality of arms 121 are packed in a can similar to that depicted in FIGURE 19. The arms are attached to the can by hinge means. Electrical conductors run from the arms through the can and up the bore hole casing 122. In practice, an impulse is emitted from source D. The echo of the impulse is received at points A, B and C and transmitted to the surface of the earth. The distance from the bore hole or sound source D to the cavity wall is readily determined from these data by routine triangulation calculations.

The orientation of the arms with respect to the presence of the compass and the azimuth are controlled and recorded in accordance with well-known techniques employed in connection with the location and operation of down hole devices known to the art. The entire cavity can be scanned and measured by reorienting the arms periodically or continuously. The wide separation of receiver points made possible by the practice of this invention provides a high degree of precision in the measurements made.

According to other embodiments of this invention, elaborate flow diverters are introduced to a cavity without being damaged. FIGURES 22 through 24 illustrate one such device and its introduction to a cavity. FIGURE 22 illustrates a split can emerging from a casing 125. The can comprises a base plate 126 and two half cans 127. Tubing 128 passes through the can. The half cans are held to the plate by means of pins 129 which are rigidly attached to the half cans 127 and fit into holes 130 in plate 126. The plate 126 is rigidly attached to tubing 127. As the can emerges from the casing, the half cans split in response to the pressure of the flow diverter 131 packed in the can. The flow diverter is in the form of a large umbrella constructed of any suitable material, e.g., rubberized nylon canvas. The umbrella is biased to open when the half cans are freed from the casing. As is seen from FIGURE 24, solvent flow is through the annulus between tubing 128 and casing 125. The solvent is deflected by the flow diverter toward the walls of the cavity. Solution withdrawal is through tubing 128.

The apparatus of the present invention is provided through a bore hole by any convenient means. Often tubing passes through the carrier and is attached thereto. The apparatus is then pushed through the casing by the tubing. In other embodiments, the carrier is attached to a liner and the liner is suspended from the casing by packing means. By "liner" is meant a conduit which is disposed inside a casing but extends only a portion of the length of the casing, typically from the cavity only a few feet up the casing. "Tubing" refers to similar conduits which extend from the earth's surface down through the casing. Liners are set in a casing by well-known techniques on tubing strings or by means of wire lines.

The hatches of the claimed apparatus are openings of any convenient size and shape. There may be one or a plurality of such hatches in a given apparatus. A hatch may be covered with a door for added protection. The door, typically a removable section of the carrier, may be mechanically biased by means provided for that purpose. Alternatively, the doors may be removed in response to electrical or magnetic impulses or any other suitable means. Opening of the hatches is usually correlated with emergence of the apparatus from a casing into a cavity. It is within contemplation that the opening of the hatch be correlated with some other reference point, e.g., when the carrier strikes the bottom of the cavity or reaches a pre-determined pressure or temperature environment in the cavity.

Orientation means are often included in association with the carrier assemblies of this invention. Means within contemplation include simple hinge means adjusted to stop or lock in a pre-determined position as the down hole device falls from the carrier. More sophisticated means may be employed when it is desired to adjust from time to time the orientation of the device with respect to horizontal or with respect to the points of the compass. Such means will readily suggest themselves to the skilled art and the invention is not limited in scope to the specific means illustrated in the drawings.

The dimensions of the claimed apparatus are restricted only by the height of the cavity and the diameter of the bore hole casing through which it is emplaced in the cavity. Thus, the outer diameter of the carrier or can need be only very slightly smaller than the internal diameter of the casing. The total height of the can may be even greater than the height of the cavity provided the top of the hatch is below the bottom of the casing when the can touches the bottom of the cavity. In a cavity 50 feet high, for example, a can nearly 50 feet long may be conveniently employed. If it is desired to relocate the down hole mechanism near the top of the cavity after it has been released near the bottom of the cavity, the can need merely be partially withdrawn up the bore hole.

It is not intended to limit the scope of this invention to the details of the specific embodiments referred to herein except insofar as these details appear in the appended claims.

We claim:
1. Apparatus for protectively introducing a device through a bore hole casing to a subterranean cavity comprising a container sized to slip through said casing and adapted to protectively contain said device while it is in said casing, hatch means constructed and arranged to provide access from said container for said device, a protective cover associated with said hatch means constructed and arranged to protect said device in said container in said bore hole, said cover being adapted to fall away when said container is moved through said casing into said cavity.

2. The apparatus of claim 1 wherein the container includes a plurality of fluid-carrying conduits one of said conduits being adapted to supply solvent to a solvent delivery device carried by said container.

3. The apparatus of claim 1 wherein the hatch is covered by a removable section of the container.

4. The apparatus of claim 1 adapted to releasably contain a device selected from the group consisting of solvent supply systems, fluid flow diverters, electronic measuring devices, sample retrieval devices and photographic equipment.

5. The apparatus of claim 1 including biasing means to push the device carried by the container out of the hatch.

6. The apparatus of claim 1 adapted to releasably contain a solvent supply system and including an orientation means to orient said system in a pre-determined direction with respect to horizontal.

7. The apparatus of claim 6 wherein the carrier is attached to a solvent supply conduit, the orientation means includes a fluid-carrying passage and said fluid-carrying passage openly connects said solvent supply conduit with the solvent supply system carried by said apparatus.

8. The apparatus of claim 7 wherein the orientation means is a valve means adapted to close the said fluid-carrying passage when the apparatus is disposed in a bore hole and to open said passage when the apparatus releases the solvent supply system contained therein.

9. The apparatus of claim 7 wherein a second conduit extends through the carrier and openly communicates with the cavity when the apparatus is emplaced at the bottom of the casing.

References Cited
UNITED STATES PATENTS

| | | | |
|---|---|---|---|
| 1,427,944 | 9/1922 | Crotto | 166—223 |
| 2,198,821 | 4/1940 | Jessup | 166—100 |
| 2,253,224 | 8/1941 | Bleakley | 166—192 |
| 2,293,974 | 8/1942 | Eckel | 166—243 X |
| 2,693,342 | 11/1954 | Lynes | 166—100 X |
| 2,822,158 | 2/1958 | Brinton | 299—5 X |
| 2,903,069 | 9/1959 | Lebourg et al. | 166—117 |
| 3,054,455 | 9/1962 | Keltner | 166—187 X |
| 3,189,107 | 6/1965 | Galle | 175—393 |
| 3,191,697 | 6/1965 | Haines | 175—422 X |
| 3,297,362 | 1/1967 | Currier | 61—.5 |

ERNEST R. PURSER, *Primary Examiner.*